United States Patent

[11] 3,581,498

| | | | |
|---|---|---|---|
| [72] | Inventor | Sylvester R. Cudnohufsky |
| | | 1290 Lake Angelus Shore Drive, Pontiac, Mich. 48055 |
| [21] | Appl. No. | 819,221 |
| [22] | Filed | Apr. 25, 1969 |
| [45] | Patented | June 1, 1971 |

[54] HYDROSTATIC TRANSMISSION
6 Claims, 1 Drawing Fig.

[52] U.S. Cl. ................................................. 60/52, 60/53
[51] Int. Cl. .............................................. F15b 15/18
[50] Field of Search ............................... 60/53, 53 A, 52 B, 52 VSP

[56] References Cited
UNITED STATES PATENTS

| | | | |
|---|---|---|---|
| 3,161,137 | 12/1964 | Thoma et al. ............... | 60/52VSPX |
| 3,224,197 | 12/1965 | Lauck ......................... | 60/52VSPX |
| 3,359,727 | 12/1967 | Hann et al. .................. | 60/52VSPX |
| 3,451,218 | 6/1969 | Grant ........................... | 60/52VSP |

*Primary Examiner*—Edgar W. Geoghegan
*Attorney*—Barnes, Kisselle, Raisch & Choate

ABSTRACT: A hydrostatic transmission for a machine tool. The transmission includes a pump driven by a prime mover, a motor for the machine tool driven by the pump, relief valves for "shorting out" exceedingly high pressures, and a bypass conduit extending between the high- and low-pressure sides of the system. A pilot-operated valve in the bypass conduit is adapted to be opened when the pump displacement is reduced to a predetermined low value to equalize the pressure on opposite sides of the motor and thereby cause the motor to stop.

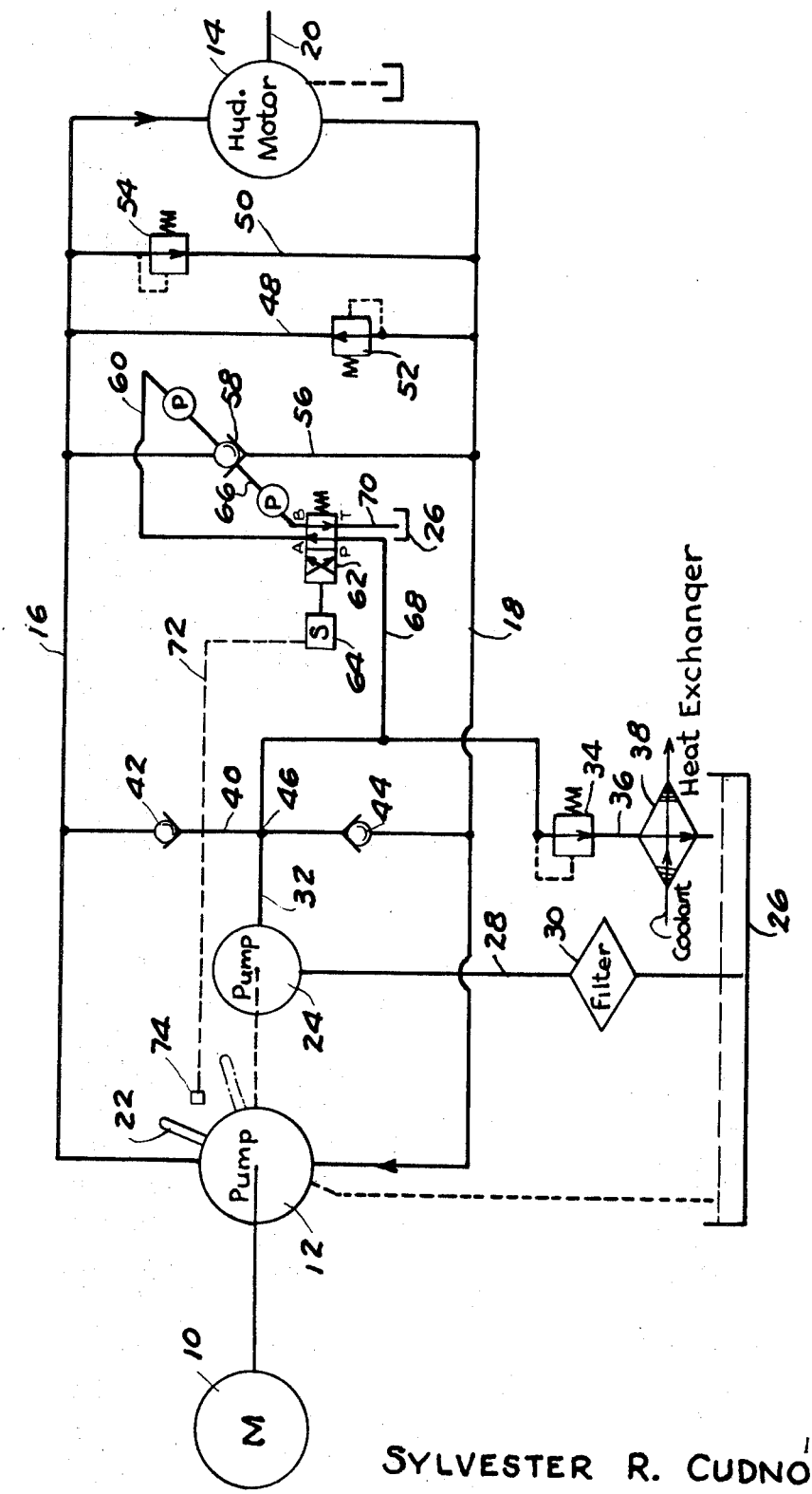

HYDROSTATIC TRANSMISSION

This invention relates to a hydrostatic transmission and more particularly to a braking arrangement in a hydrostatic transmission.

A hydrostatic transmission in its commonest form is a hydraulic system in which a prime mover such as an electric motor, an internal combustion engine, etc., operates a hydraulic pump which is, in turn, connected in a closed circuit with a hydraulic motor. More specifically, in a hydrostatic transmission, the outlet of the pump is connected with the inlet of the motor and the outlet of the motor is connected with the inlet of the pump. The pump is usually of the variable displacement type, and the motor is either of the fixed or variable displacement type. Such transmissions are characterized by the production of very high power over a very wide speed range. For this reason, hydrostatic transmissions are frequently used for operating machine tools, particularly some types of lathes.

While the use of hydrostatic transmissions has proved to be ideal in many situations, nevertheless such transmissions usually involve several practical problems. In the first place, there is a certain amount of leakage from the pump and the motor and as a result, it is common practice to provide an auxiliary pump also driven by the prime mover for supplying makeup oil to the system. A further problem which occurs results from the varying load conditions on the motor which sometimes results in the generation of very large back pressures requiring the incorporation of relief valves suitably located in the system.

One of the most serious problems that arises in connection with hydrostatic transmissions is one of control. In such an arrangement, it is necessary to start, stop, and usually reverse the pump-driven motor. This is sometimes done with a conventional but large four-way valve in combination with one or more pressure relief valves. However, the use of such valves is not a good solution to the problem of control because such large valves are costly and also because there is a certain amount of leakage with such valves. When it is desired to stop the motor, the four-way valve is actuated to block the flow of fluid from the pump to the motor and relief valves are utilized to supply the braking force. However, any leakage through the four-way valve usually results in the motor being under sufficient differential pressure to drift in the direction of maximum leakage. If a person is trying to load a part into the chuck of a lathe driven by a hydrostatic transmission braked in this manner, creeping of the chuck poses a very serious problem. Likewise, in an arrangement where the braking is provided by a conventional four-way valve and one or more relief valves, if for some reason the relief valves fail to function, a hydraulic shock of monumental proportions may be propagated throughout the components of the system.

The present invention has for its object the provision of a control arrangement for a hydrostatic transmission which enables stopping or reversing the motor quickly and without hydraulic shock and which, at the same time, eliminates any tendency for the motor to creep when the control is actuated to the brake position.

More specifically, it is an object of the present invention to provide a braking control for a hydrostatic transmission which merely involves the incorporation of a bypass conduit between the high- and low-pressure sides of the system with a valve in the bypass conduit which normally isolates the high-pressure side from the low-pressure side of the system and which can be actuated to open and equalize the pressures at the inlet and the outlet of the motor.

In the single FIGURE wherein a hydrostatic transmission according to this invention is illustrated diagrammatically, a prime mover 10 is arranged to drive a pump 12 which is connected in a closed hydraulic circuit with motor 14 by conduits 16 and 18. Motor 14 is adapted to drive the spindle, designated diagrammatically by numeral 20, of a lathe or the like. Pump 12 is preferably of the reversible, variable displacement type. In the drawing, the means for varying the displacement of the pump and for reversing it is shown merely by way of illustration as a lever 22.

The pump for supplying makeup oil to the system is designated 24 and has its inlet connected to tank 26 by a conduit 28 and a filter 30. The outlet of pump 24 is connected by a conduit 32 with a relief valve 34 which is, in turn, connected to tank 26 by a conduit 36 and a heat exchanger 38. Conduit 32 also connects with a conduit 40 extending between conduits 16 and 18. Check valves 42 and 44 are arranged in conduit 40 on opposite sides of its junction 46 with conduit 32 as shown in the drawing. Check valves 42, 44 are arranged so that the makeup oil from pump 24 will always be supplied to the low-pressure return line in the system. Thus, if pump 12 is operating such that conduit 16 is the high-pressure feed line and conduit 18 is the low-pressure return line, then check valve 44 opens to replenish the low-pressure side of the circuit through return line 18 until such time as the pressure in return line 18 is equal to the setting of valve 34 which, for example, may be 150 pounds per square inch.

Conduits 16 and 18 are also interconnected by conduits 48 and 50. A high-pressure relief valve 52 is arranged in conduit 48 and a similar high-pressure relief valve 54 is arranged in conduit 50. Relief valves 52, 54 are provided for "shorting out" pressure excesses over a predetermined high value and may be set to open, for example, at a pressure of 5,000 pounds per square inch.

The braking arrangement to which the present invention is specifically directed comprises a bypass conduit 56 extending between conduits 16 and 18 and a pilot-operated valve 58 in conduit 56. One side of the ball check in valve 58 is connected by a conduit 60 to port A of a four-way valve 62 operated by a solenoid 64. The other side of the ball check in valve 58 is connected by a conduit 66 with port B of valve 62. The pressure port P of valve 62 is connected by a conduit 68 with conduit 32, and the tank port T is connected to tank 26 as by conduit 70. In the system illustrated with valve 58 closed, conduit 16 supplies oil at the high-pressure developed by pump 12 to motor 14 and conduit 18 forms a low-pressure return line. Valve 58 is maintained in the closed position by the low supply pressure from pump 24.

In other words, the opening and closing of valve 58 is controlled by the pressure differential across the valve through conduits 60 and 66, not through bypass conduit 56.

In the arrangement illustrated, solenoid 64 is adapted to be actuated by the means for controlling the displacement of pump 12 which, as pointed out previously, is indicated merely for purposes of illustration as a lever 22. In practice, a hydraulic cylinder would normally be used for stroking pump 12. Solenoid 64 is shown connected by a conductor 72 with a switch or other suitable means 74 which are adapted to be actuated by lever 22 when lever 22 is adjusted so that the pump displacement is zero or other relatively low value.

With the system operating as shown in the FIGURE, it is assumed that conduit 16 is the high-pressure feed line so that the oil from pump 12 is delivered to the inlet of motor 14 and the motor exhausts back to the inlet of pump 12 through the low-pressure return line 18. The low-pressure side of the system is replenished with makeup oil from pump 24 through check valve 44. Valve 58 is maintained in the closed position by the low-pressure developed by pump 24 through valve 62 and conduit 60. When it is desired to stop motor 14, lever 22 is stroked toward the zero displacement position, at which position it actuates switch 74 and thereby energizes solenoid 64.

As soon as the pump is stroked toward its zero displacement position, motor 14 immediately begins to act as a pump generating a large back pressure because of the high-inertia load on the motor. This back pressure is dissipated very quickly across relief valves 52 or 54, depending on whether conduit 16 or conduit 18 is the low-pressure return line. As a result, the motor slows down very rapidly, in fact almost exactly as quickly as pump 12 is stroked to its zero delivery position. In practice, this cycle can be as little as 1 to 3 seconds in the case of a system having a rating of about 100 gallons per minute.

When almost all of the energy stored in the load has been dissipated, the pressure generated by motor 14 drops below the setting of relief valves 52, 54. However, as soon as solenoid 64 is energized, valve 62 shifts to immediately reverse the flow in pilot lines 60, 66 and open valve 58 and thus permit bypass line 56 to establish free communication between conduits 16 and 18. When this occurs, the pressure on the opposite sides of motor 14 is immediately equalized and motor 14 is merely operating against its static and seal friction load. These hydrostatic transmissions ordinarily operate at such high power levels that the static friction will be high enough to remove the residual energy of the load inertia very rapidly and thus produce a relatively short braking cycle. Thus, in the braked condition of motor 14, conduits 16 and 18 are at equal pressures (the setting of valve 34) and there will be no tendency for motor 14 to creep. The absence of drive pressure on the motor allows the static friction to lock the motor firmly in place. While the motor can be turned by an external force sufficient to overcome the static friction, it will not start by itself and the lathe spindle or other device driven by motor 14 will remain perfectly stationary.

The advantages of the above-described arrangement are believed to be apparent. When valve 58 is open, there is no leakage whatsoever that would have a tendency to cause the motor to creep. If the pump is not stroked completely to its zero delivery position before valve 58 is opened, no harm results because the pump and motor are short circuited. In some situations, it may even be desirable to open valve 58 while pump 12 is still delivering a predetermined low quantity of oil which, of course, will be at a negligible pressure. Likewise it will be noted that, since valve 58 does not interrupt the flow in the system but merely redirects it, this valve may be opened even when the pump is delivering at its full rated capacity without producing any harmful results.

The use of the above-described arrangement also eliminates expensive large-capacity valves and a great deal of large-size high-pressure lines. In addition, operation of the system while motor 14 is not rotating, whether the pump is in the zero delivery condition or not, does not cause any appreciable heating of the oil. As long as the pilot-operated valve 58 is open, pump 12 is delivering negligible power and the oil therefor circulates through bypass conduit 56 at the relatively low pressure determined by the setting of valve 34.

I claim:

1. In a hydrostatic transmission of the type including a pump and motor hydraulically coupled in a closed circuit with the pump outlet connected to the motor inlet to define the high-pressure side of the circuit and the motor outlet connected with the pump inlet to define the low-pressure side of the circuit, that improvement which comprises, a bypass conduit extending between and interconnecting the high- and low-pressure sides of said circuit, hydraulically actuated valve means in said bypass conduit for controlling the flow through said conduit, said valve means being pilot operated by the pressure on one side of the circuit, said valve means when closed preventing flow through said bypass conduit, and means for selectively directing pressure from said one side of the circuit to said valve means for opening said valve means to establish free communication between the high- and low-pressure sides of the circuit and thereby equalize the pressure on opposite sides of the motor.

2. A hydrostatic transmission as called for in claim 1 wherein said valve means is pilot operated from the low-pressure side of said circuit.

3. A hydrostatic transmission as called for in claim 1 wherein said pump is of the variable displacement type and includes adjustable means for varying the displacement thereof, said valve means normally preventing flow in said bypass conduit, said valve opening means comprising a second valve connecting said pilot-operated valve means for pilot operation by the pressure on the low-pressure side of the circuit, and means operatively connecting said second valve and said adjustable means for actuating said second valve in response to adjustment of the displacement of the pump to a predetermined low value.

4. A hydrostatic transmission as called for in claim 1 wherein said means for opening said valve means comprise a second valve adapted, when actuated, to connect the low-pressure side of the circuit with said pilot-operated valve means to thereby open the latter, and means for actuating the second valve.

5. A hydrostatic transmission as called for in claim 4 including means for varying the output of the pump, said means for actuating said second valve comprising means operatively connecting said output-varying means and said second valve to interconnect said pilot-operated valve means with the low-pressure side of the system when the output-varying means are actuated to reduce the output of the pump to a predetermined low value.

6. A hydrostatic transmission as called for in claim 1 wherein said valve-opening means comprises a conduit extending from said valve means to the low-pressure side of said circuit, and valve means in said last-mentioned conduit for permitting and blocking flow through said last-mentioned conduit to control the operation of the pilot-operated valve means.